Patented Mar. 26, 1946

2,397,355

UNITED STATES PATENT OFFICE 2,397,355

THIOZONIDES OF THE 2 CYCLO-ALKEN-1 ONE SERIES

Oskar Huppert, Newark, N. J.

No Drawing. Application February 11, 1944,
Serial No. 521,978

2 Claims. (Cl. 260—125)

The present invention has as its origination the fact that isophorone-oxazoline compounds, which show a deep green fluorescence, change their color to deep purple red by addition of sulfur flowers at a temperature of 100° C.

This invention relates to new compounds, thiozonides of isophorone and to processes for making these thiozonides.

I have discovered that 3.5.5 trimethyl-2 cyclohexen-1 one (isophorone) reacts with sulfur and alkali metal hydroxide at once by room temperature to a deep purple red liquid, which appears blue, using an excess of alkali.

I have further discovered that the isophorone-sulfur reaction is not specific to alkali metal hydroxide, other bases as amines, alkanolamines, oxazolines are effective also.

It is assumed that the product resulting from the reaction of isophorone, sulfur and sodium hydroxide, the sodium salt of isophorone thiozonide, has the formula as follows:

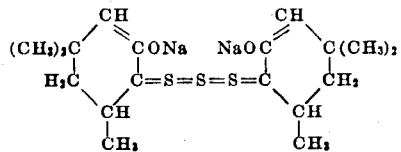

The following examples are illustrative methods that may be used in carrying out the invention.

Example 1

To 2 mol isophorone (276 g.) there is added 3 atom portions of sulfur flowers (96 g.) and the mixture is warmed to 20 to 30° C. Afterwards there is added an 18 per cent aqueous solution of sodium hydroxide containing at least 40 g. of NaOH.

Example 2

2 mol isophorone (276 g.), 96 g. sulfur flowers are mixed and warmed to 25° C. Afterwards there is added 80 g. sodium hydroxide, dissolved in 160 g. alcohol. One obtains thus by evaporating the sodium salt of the isophorone thiozonide.

As many apparently widely different embodiments of this invention may be made without departing from the spirit and scope thereof, it is understood that I do not limit myself to the specific embodiments thereof except as defined in the following claims.

I claim:

1. A process of producing the thiozonide of isophorone (3.5.5 trimethyl 2 cyclohexen-1 one) which comprises reacting isophorone, alkali metal hydroxide and sulfur.

2. As a new compound the product resulting from the reaction of isophorone, alkali metal hydroxide and sulfur.

OSKAR HUPPERT.